US011025523B2

(12) United States Patent
Li

(10) Patent No.: US 11,025,523 B2
(45) Date of Patent: Jun. 1, 2021

(54) PATH DETECTION

(71) Applicant: NEW H3C TECHNOLOGIES CO., LTD., Hangzhou (CN)

(72) Inventor: Jinglin Li, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 10 days.

(21) Appl. No.: 16/499,841

(22) PCT Filed: Apr. 2, 2018

(86) PCT No.: PCT/CN2018/081569
§ 371 (c)(1),
(2) Date: Sep. 30, 2019

(87) PCT Pub. No.: WO2018/177437
PCT Pub. Date: Oct. 4, 2018

(65) Prior Publication Data
US 2020/0028770 A1    Jan. 23, 2020

(30) Foreign Application Priority Data
Mar. 31, 2017   (CN) .......................... 201710210833.4

(51) Int. Cl.
*H04L 12/26* (2006.01)
*H04L 12/721* (2013.01)
(Continued)

(52) U.S. Cl.
CPC .......... *H04L 43/10* (2013.01); *H04L 43/0829* (2013.01); *H04L 45/26* (2013.01); *H04L 45/28* (2013.01); *H04L 45/74* (2013.01)

(58) Field of Classification Search
CPC ..... H04L 43/10; H04L 43/0829; H04L 45/26; H04L 45/28; H04L 45/74; H04L 45/00; H04L 45/20
(Continued)

(56) References Cited

U.S. PATENT DOCUMENTS 9,344,320 B1 * 5/2016 Volkman ............... H04L 69/164
2004/0071080 A1   4/2004 Uchiyama et al.
(Continued)

FOREIGN PATENT DOCUMENTS

CN    101771604 A    7/2010
CN    102437931 A    5/2012
(Continued)

OTHER PUBLICATIONS

ISA State Intellectual Property Office of the People's Republic of China, International Search Report Issued in Application No. PCT/CN2018/081569, dated Jun. 28, 2018, WIPO, 4 pages.
(Continued)

*Primary Examiner* — Mang Hang Yeung
(74) *Attorney, Agent, or Firm* — McCoy Russell LLP

(57) ABSTRACT

Methods for detecting a path, a forwarding device and a machine-readable storage medium are provided. In an example, a first forwarding device receives a first detection packet sent from a previous hop forwarding device on a path of a designated service flow and used for detecting the path of the designated service flow; the first forwarding device obtains a second detection packet by adding a device address of the first forwarding device to a payload of the first detection packet; the first forwarding device forwards the second detection packet to a next hop forwarding device on the path of the designated service flow based on forwarding information in a header of the second detection packet; and the first forwarding device sends to a SDN controller a
(Continued)

forwarding error message in which a device address of at least one forwarding device in the payload of the first detection packet is carried.

11 Claims, 5 Drawing Sheets

(51) Int. Cl.
*H04L 12/703* (2013.01)
*H04L 12/741* (2013.01)

(58) Field of Classification Search
USPC .......................................... 370/252
See application file for complete search history.

(56) References Cited

U.S. PATENT DOCUMENTS

| | | | |
|---|---|---|---|
| 2004/0199627 A1* | 10/2004 | Frietsch | H04L 69/40 709/224 |
| 2007/0171836 A1* | 7/2007 | Yoshimi | H04L 29/12528 370/250 |
| 2008/0151764 A1 | 6/2008 | Wing et al. | |
| 2009/0086645 A1 | 4/2009 | Hedayat et al. | |
| 2010/0271960 A1 | 10/2010 | Krygowski | |
| 2015/0381457 A1 | 12/2015 | Xiao et al. | |
| 2016/0182303 A1* | 6/2016 | Baba | H04L 67/12 370/351 |
| 2016/0337314 A1 | 11/2016 | Yu et al. | |

FOREIGN PATENT DOCUMENTS

| | | |
|---|---|---|
| CN | 104219144 A | 12/2014 |
| CN | 104780095 A | 7/2015 |
| CN | 106230726 A | 12/2016 |
| JP | 2015005926 A | 1/2015 |
| WO | 2016123314 A1 | 8/2016 |

OTHER PUBLICATIONS

State Intellectual Property Office of the People's Republic of China, Office Action and Search Report Issued in Application No. 201710210833.4, dated May 17, 2019, 9 pages. (Submitted with Partial Translation).

ISA State Intellectual Property Office of the People's Republic of China, Written Opinion of the International Searching Authority Issued in Application No. PCT/CN2018/081569, dated Jun. 28, 2018, WIPO, 4 pages.

European Patent Office, Extended European Search Report Issued in Application No. 18775605.1, dated Dec. 20, 2019, Germany, 11 pages.

Japanese Patent Office, Office Action Issued in Application No. 2019-553943, dated Sep. 29, 2020, 9 pages. (Submitted with Machine Translation).

European Patent Office, Office Action Issued in Application No. 18775605.1, dated Oct. 5, 2020, Germany, 5 pages.

Japanese Patent Office, Office Action Issued in Application No. 2019-553826, dated Sep. 29, 2020, 13 pages. (Submitted with Machine Translation).

* cited by examiner

PATH DETECTION

CROSS REFERENCE TO RELATED APPLICATIONS

The present application is a U.S. National Phase of International Patent Application Serial No. PCT/CN2018/081569 entitled "PATH DETECTION," filed on Apr. 2, 2018. International Patent Application Serial No. PCT/CN2018/081569 claims priority to Chinese Patent Application No. 201710210833.4 filed on Mar. 31, 2017. The entire contents of each of the above-cited applications are hereby incorporated by reference in their entirety for all purposes.

BACKGROUND

To implement operation and maintenance of an Internet Protocol (IP) network, a path of a service flow through the network needs to be detected.

A traceroute mechanism can be used for path detection. In the traceroute mechanism, a detection packet is sent based on an IP address of a destination host (abbreviated as a destination IP address), so as to detect the path of the service flow from a source host to the destination host.

The detection packet in the traceroute mechanism is different from a service flow packet. For example, a port number configured for the detection packet may be different from that for the service flow packet, so as to avoid effect of the detection packet on the service flow.

DETAILED DESCRIPTION OF THE EMBODIMENTS

The following description is merely illustrative of some embodiments of the present disclosure but is not intended to limit the disclosure, and any modifications, equivalent substitutions or adaptations thereto within the spirit and scope of the disclosure shall be encompassed in the appended claims.

In the traceroute mechanism, forwarding information in a header of a detection packet for detecting a path of a service flow is different from forwarding information in a header of the service flow. Taking a user datagram protocol (UDP) port number as an example of the forwarding information, a normal UDP port number may correspond to a certain pre-defined application. In the traceroute mechanism, to avoid potential effect of the detection packet on an actual service application, a UDP port number in the header of the detection packet may be a specific UDP port number (e.g., a UDP port number greater than 30000), which dose not correspond to any service application and is different from any UDP port number for a corresponding service flow application in a header of the service flow. However, whether the detection packet or the service flow is to be forwarded, the forwarding path is selected based on the forwarding information in the header when there is an equal-cost path or a policy-based route (PRB). Since the forwarding information in the header of the detection packet is different from the forwarding information in the header of the service flow, the path finally detected based on the detection packet is different from an actual path of the service flow.

In examples of the present disclosure, the detection packet for detecting the path of the service flow is constructed by simulating the header of the actual service flow. Thus, when each forwarding device forwards the detection packet based on the forwarding information in the header of the detection packet, it can be ensured that forwarding behavior corresponding to the detection packet is consistent with that corresponding to the actual service flow, so that the path of the actual service flow could be precisely determined.

Figure 1:
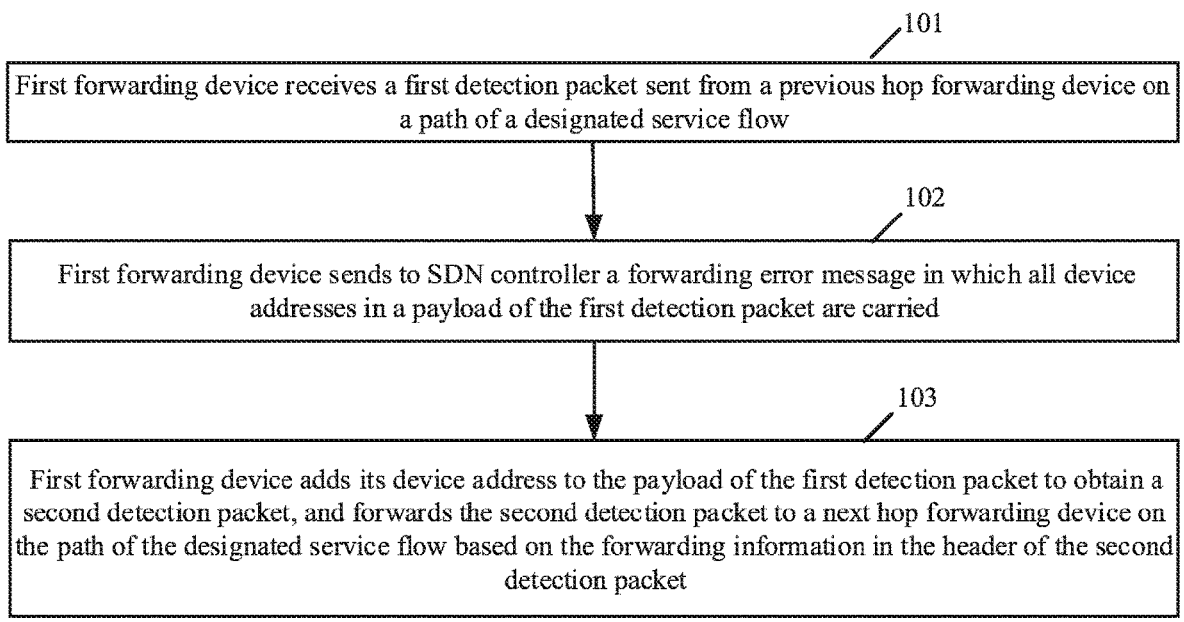
FIG. 1 is a flowchart illustrating a method based on an example of the present disclosure.

FIG. 1 is a flowchart illustrating a method based on an example of the present disclosure. The method can be applied to a forwarding device. In an example, the forwarding device may be a router or the like, which is not limited in examples of the present disclosure.

As shown in FIG. 1, the method may include procedures as follows.

At block 101, a first forwarding device receives a first detection packet sent from a previous hop forwarding device on a path of a designated service flow.

In an example, the first forwarding device is any non-initial forwarding device on the path of the designated service flow.

In an example, when the previous hop forwarding device is an initial forwarding device on the path of the designated service flow, the first detection packet is a detection packet for detecting the path of the designated service flow, which is constructed by the initial forwarding device based on a control command from a SDN controller. When the initial forwarding device forwards the constructed detection packet, its device address is carried in a payload of the detection packet.

Forwarding information in the header of the designated service flow is carried in the control command, such that forwarding information in the header of the constructed detection packet is the same as the forwarding information in the header of the designated service flow. The SDN controller may determine the initial forwarding device on the path of the service flow as follows: calculating each path from a source IP address of the service flow to a destination IP address of the service flow based on the source IP address, the destination IP address and network topology managed by the SDN controller; sampling a service flow for an initial forwarding device on each path; and determine an initial forwarding device, through which a service flow has passed, as the initial forwarding device on the path of the service flow.

In another example, when the previous hop forwarding device is a non-initial forwarding device on the path of the designated service flow, the previous hop forwarding device constructs no detection packet but forwards the received detection packet to the first forwarding device. The detection packet forwarded to the first forwarding device is the first detection packet.

The forwarding information in the header of the first detection packet is the same as the forwarding information in the header of the designated service flow. The forwarding information in the first detection packet will be described below by way of example.

At block 102, the first forwarding device sends to the SDN controller a forwarding error message in which all device addresses in a payload of the first detection packet are carried.

In an example, the header of the first detection packet includes a Time To Live (TTL) field, where the TTL field is set to an initial value.

With regard to the TTL field in the header of the first detection packet, the process at block 102 where the first forwarding device sends the forwarding error message to the SDN controller may comprise procedures as follows.

The TTL field in the header of the first detection packet is updated. When the updated TTL field is equal to zero, it may be confirmed that an error occurs in the forwarding of the first detection packet, and the forwarding error message is sent to the SDN controller.

In an example, the updating of the TTL field in the header of the first detection packet may comprise subtracting a preset value from the TTL field in the header of the first detection packet. The preset value may be equal to the initial value above.

In an example, the first detection packet with the TTL field in the header updated as zero may be used as the forwarding error message.

At block 103, the first forwarding device adds its device address to the payload of the first detection packet to obtain a second detection packet, and forwards the second detection packet to a next hop forwarding device on the path of the designated service flow based on the forwarding information in the header of the second detection packet.

In an example, at block 103, the TTL field in the header of the second detection packet is set to the initial value. Thus, when receiving the second detection packet, the next hop forwarding device on the path of the designated service flow subtracts the preset value equal to the initial value from the TTL field in the header of the second detection packet, and thus may confirm that an error occurs in the forwarding of the second detection packet. Then, the next hop forwarding device may perform the process of sending the forwarding error message to the SDN controller at block 102. Thus, upon receiving the second detection packet, the next hop forwarding device may perform processes substantially the same as those at blocks 102 and 103, wherein the next hop forwarding device is regarded as the first forwarding device and the second detection packet is regarded as the first detection packet.

It should be noted that the procedure at block 102 may be performed before or after the procedure at block 103, which is not limited in examples of the present disclosure.

Figure 2:
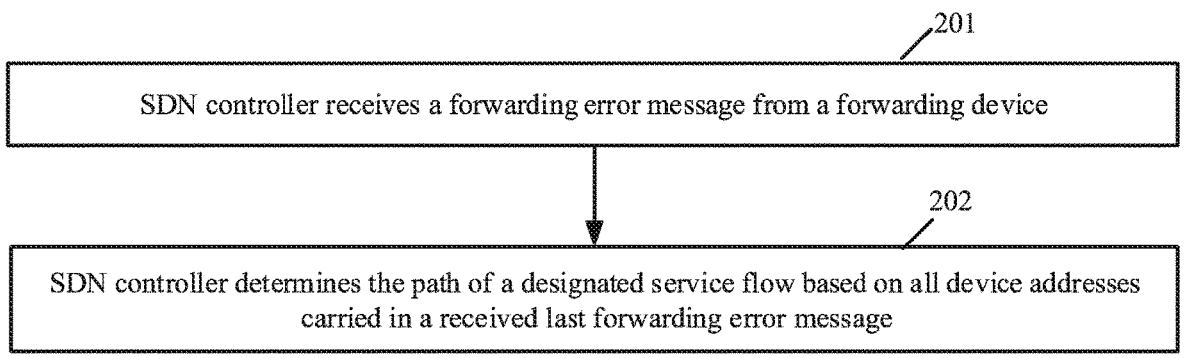
FIG. 2 is a schematic diagram illustrating packet structures based on an example of the present disclosure.

From block 103, it can be seen that, when forwarding the detection packet, each forwarding device on the path of the designated service flow adds its device address to the detection packet. Moreover, referring to block 102, all the device addresses in the payload of the first detection packet are carried in the forwarding error message. It follows that the forwarding error message, which is sent to the SDN controller by a last hop forwarding device on the path of the designated service flow, includes device addresses of all forwarding devices on the path of the designated service flow except the last hop forwarding device, and an order of the respective device addresses in the forwarding error message is the same as an order of the corresponding forwarding devices on the path of the designated service flow. Thus, the SDN controller can accurately determine the path of the designated service flow based on the forwarding error message sent by the last hop forwarding device, which will be described below in terms of a method applied to the SDN controller as shown in FIG. 2.

In an example, the header of the first detection packet further includes a checksum field which is configured as a designated check value indicating a checksum error, such that a destination host corresponding to the service flow discards the first detection packet upon receiving the first detection packet.

In an example, the header of the first detection packet includes an IP header and a transport layer protocol header (e.g., TCP/UDP header). The TTL field is in the IP header, and the checksum field is in the TCP/UDP header. The forwarding information in the IP header may include a source IP address, a destination IP address, a protocol type and a Differentiated Services Code Point (DSCP). The forwarding information in the TCP/UDP header may include a source port number and a destination port number.

In an example, based on actual requirement, a further header may be added to the constructed detection packet as mentioned above. For example, when a path of a Virtual Extensible Local Area Network (VXLAN) packet is to be detected, a VXLAN header may be added to the constructed detection packet.

So far, the process in FIG. 1 ends.

From the example process above, it can be seen that the forwarding device may construct the detection packet for detecting the path of the service flow by simulating the header of the actual service flow. Thus, when each forwarding device forwards the detection packet based on the forwarding information in the header of the detection packet, it can be ensured that forwarding behavior corresponding to the detection packet is consistent with that corresponding to the actual service flow, so that the path of the actual service flow could be precisely determined.

FIG. 2 is a flowchart illustrating another method based on an example of the present disclosure, which corresponds to procedures in FIG. 1. The method can be applied to a SDN controller.

As shown in FIG. 2, the method may include procedures as follows.

At block 201, a SDN controller receives a forwarding error message from a forwarding device. The forwarding device may be any non-initial forwarding device on the path of the designated service flow.

As mentioned above, the forwarding error message is sent by the forwarding device upon receiving a detection packet.

Before performing procedures in FIG. 2, the SDN controller may determine an initial forwarding device on the path of the designated service flow, and send a control command to the initial forwarding device, such that the initial forwarding device constructs the detection packet. The SDN controller may determine the initial forwarding device on the path of the designated service flow by the sampling method above.

In an example, all of device addresses in a payload of the detection packet are carried in the forwarding error message sent by the forwarding device. All the device addresses comprise device addresses of respective forwarding devices, through which the detection packet has passed before reaching the forwarding device sending the forwarding error message.

At block 202, the SDN controller determines the path of the designated service flow based on all the device addresses carried in a received last forwarding error message.

In an example, the SDN controller may limit a period of time for detecting the path of the service flow. When no forwarding error message for detecting the path of the service flow is received in a set period of time, the SDN controller may determine a forwarding error message received recently as the last forwarding error message, and determine the path of the service flow based on all the device addresses carried in the last forwarding error message.

In an example, the SDN controller may determine the path of the service flow based on all the device addresses carried in the last forwarding error message and a device address of a determined last forwarding device on the path of the designated service flow. Herein, the SDN controller may determine the last forwarding device on the path of the service flow in a manner similar to the above method for determining the initial forwarding device on the path of the service flow. More specifically, the SDN controller may calculate each path from a source IP address of the service flow to a destination IP address of the service flow based on the source IP address, the destination IP address and the managed network topology, and sample a service flow for a last forwarding device on each path to determine the last forwarding device on the path of the service flow.

So far, the process in FIG. 2 ends.

In the example illustrated in FIG. 2, at least one device address is carried in the forwarding error message, such that the SDN controller can quickly determine the actual path of the service flow, and workload of the SDN controller can be reduced.

The process in FIG. 1 will be described in detail below by way of example.

Figure 3:
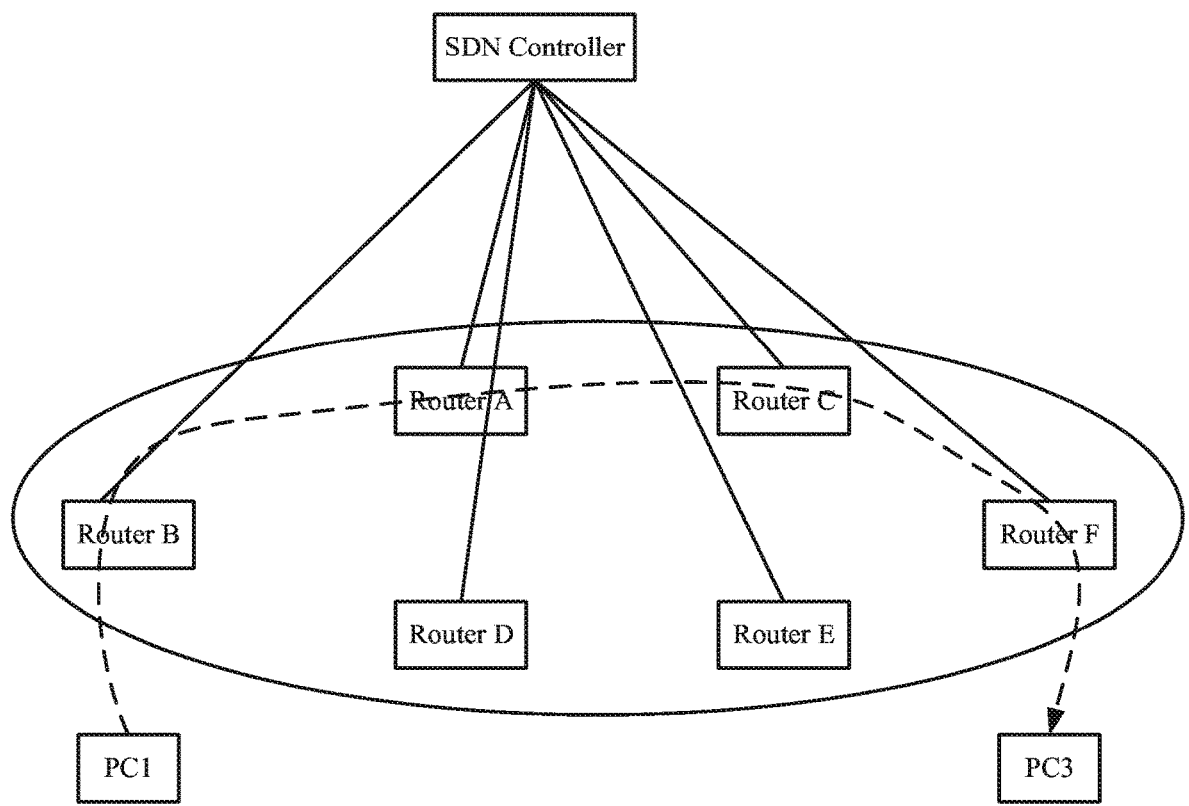
FIG. 3 is a schematic diagram illustrating an example of the present disclosure.
Figure 4:
FIGS. 4-9 are schematic diagrams illustrating various structures of a detection packet based on respective examples of the present disclosure.
Figure 5:
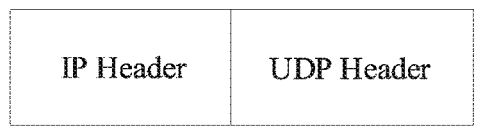

FIG. 3 is a schematic diagram illustrating an example of the present disclosure, wherein a service flow Flow1 is taken as an example. The Flow1 may comprise a video packet in a format as illustrated in FIG. 4.

A SDN controller calculates each possible path of the Flow1 based on a source IP address of the Flow1 (e.g., an IP address of PC1), a destination IP address of the Flow1 (e.g., an IP address of PC3) and a collected network topology as shown in FIG. 3, and samples a service flow for an initial forwarding device on each calculated path to determine Router B, for example, as an initial forwarding device on the path of the Flow1.

The SDN controller sends, to the initial forwarding device Router B on the path of the Flow 1, a control command in which forwarding information in a header of the Flow1 is carried. The forwarding information in the header of the Flow1 includes forwarding information in an IP header of the Flow1 and forwarding information in a UDP header of the Flow1. The forwarding information in the IP header of the Flow1 includes, for example, a source IP address (IP1), a destination IP address (IP3), a protocol type and DSCP. The forwarding information in the UDP header of the Flow1 includes, for example, a source port number and a destination port number.

Upon receiving the control command, the Router B constructs a detection packet for detecting a path of the Flow1 based on the forwarding information carried in the control command. For the convenience of description, the constructed detection packet is denoted as detection packet 1_1. A TTL field in an EP header of the detection packet 1_1 is set to an initial value (for example, 1). The IP header of the detection packet 1_1 further includes the forwarding information in the IP header of the Flow1, carried in the received control command, such as the source IP address (IP1), the destination IP address (IP3), the protocol type and the DSCP. A checksum field in a UDP header of the detection packet 1_1 is set to a designated check value (for example, 0x0) indicating a checksum error. The UDP header of the detection packet 1_1 further includes the forwarding information in the UDP header of the Flow1, carried in the received control command, such as the source port number and the destination port number.

Figure 6:
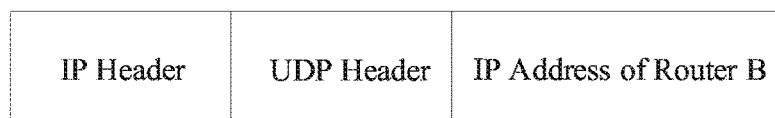

The Router B adds its IP address to the detection packet 1_1. For the convenience of description, the detection packet to which the IP address of the Router B is added is denoted as detection packet 1_2. FIG. 6 illustrates a format of the detection packet 1_2.

The Router B forwards the forwarding packet 1_2 based on forwarding information in an EP header of the detection packet 1_2 and forwarding information in a UDP header of the detection packet 1_2. In an example, the Router B notifies to the SDN controller a message that the detection packet 1_2 has been sent, such that SDN controller knows that a process of detecting a path of the Flow' starts.

It is assumed that the Router B forwards the detection packet 1_2 to Router A based on the forwarding information in the IP header of the detection packet 1_2 and the forwarding information in the UDP header of the detection packet 1_2.

The Router A receives the detection packet 1_2.

The Router A may subtract a preset value (for example, 1) from a TTL field of the detection packet 1_2 to obtain a value (for example, zero) indicating that an error occurs in the process of forwarding the detection packet 1_2. Then, the TTL field of the detection packet 1_2 may become zero. For the convenience of description, the detection packet 1_2 with the TTL field becoming zero is denoted as detection packet 1_3.

The Router A may send the detection packet 1_3 as a forwarding error message to the SDN controller.

Figure 7:
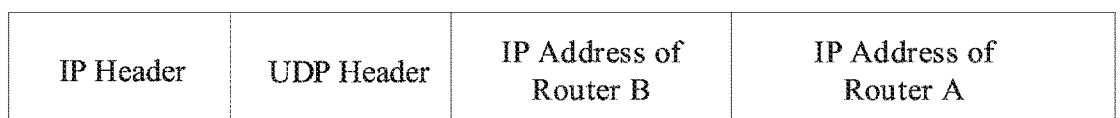

The Router A may update the TTL field of the detection packet 1_3 as an initial value (for example, 1), and add an IP address of the Router A to the detection packet 1_3. For the convenience of description, the detection packet to which the IP address of the Router A is added is denoted as detection packet 1_4. Then, the respective IP addresses of the Routers B and A are carried in the detection packet 1_4. In an example, the IP address of the Router B and the IP address of the Router A are arranged in the detection packet 1_4 in an order of addition of them to the detection packet, wherein the IP address of the Router A follows the IP address of the Router B. FIG. 7 illustrates such a structure of the detection packet 1_4.

The Router A forwards the detection packet 1_4 based on forwarding information in an IP header of the detection packet 1_4 and forwarding information in a UDP header of the detection packet 1_4. It is assumed that the Router A forwards the detection packet 1_4 to Router C based on the forwarding information in the IP header of the detection packet 1_4 and the forwarding information in the UDP header of the detection packet 1_4.

The Router C receives the detection packet 1_4.

The Router C may subtract the preset value (for example, 1) from a TTL field of the detection packet 1_4 to obtain a value (for example, zero) indicating that an error occurs in the process of forwarding the detection packet 1_4. Then, the TTL field of the detection packet 1_4 may become zero.

For the convenience of description, the detection packet 1_4 with the TTL field becoming zero is denoted as detection packet 1_5.

The Router C may send the detection packet 1_5 as a forwarding error message to the SDN controller.

Figure 8:
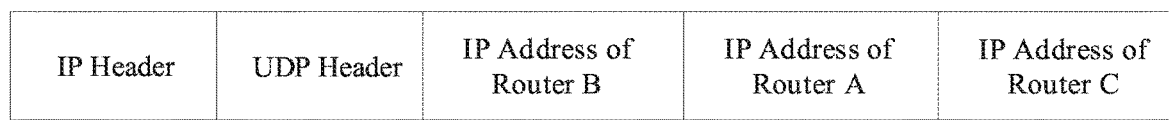

The Router C may update the TTL field of the detection packet 1_5 as the initial value (for example, 1), and add an IP address of the Router C to the detection packet 1_5. For the convenience of description, the detection packet to which the IP address of the Router C is added is denoted as detection packet 1_6. Then, the respective IP addresses of the Routers B, A and C are carried in the detection packet 1_6. In an example, the IP address of the Router B, the IP address of the Router A and the IP address of the Router C are arranged in the detection packet 1_6 in an order of addition of them to the detection packet, wherein the IP address of the Router A follows the IP address of the Router B, and the IP address of the Router C follows the IP address of the Router A. FIG. 8 illustrates such a structure of the detection packet 1_6.

The Router C forwards the detection packet 1_6 based on forwarding information in an IP header of the detection packet 1_6 and forwarding information in a UDP header of the detection packet 1_6. It is assumed that Router C forwards the detection packet 1_6 to Router F based on the forwarding information in the IP header of the detection packet 1_6 and the forwarding information in the UDP header of the detection packet 1_6.

The Router F receives the detection packet 1_6.

The Router F may subtract the preset value (for example, 1) from a TTL field of the detection packet 1_6 to obtain a value (for example, zero) indicating that an error occurs in the process of forwarding the detection packet 1_6. Then, the TTL field of the detection packet 1_6 may become zero. For the convenience of description, the detection packet 1_6 with the TTL field becoming zero is denoted as detection packet 1_7.

The Router F may send the detection packet 1_7 as a forwarding error message to the SDN controller.

Figure 9:
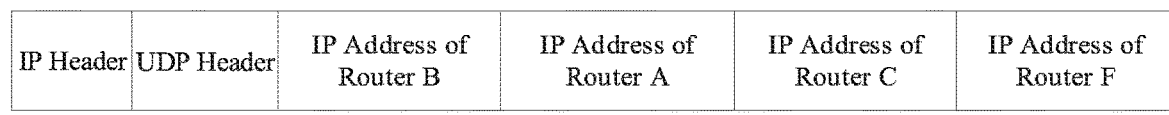

The Router F may update the TTL field of the detection packet 1_7 as the initial value (for example, 1), and add an EP address of the Router F to the detection packet 1_7. For the convenience of description, the detection packet 1_7 to which the IP address of the Router F is added is denoted as detection packet 1_8. Then, the respective IP addresses of the Routers B, A, C and F are carried in the detection packet 1_8. In an example, the IP address of the Router B, the EP address of the Router A, the IP address of the Router C and the IP address of the Router F are arranged in the detection packet 1_8 in an order of addition of them to the detection packet, wherein the IP address of the Router A follows the IP address of the Router B, the IP address of the Router C follows the IP address of the Router A, and the IP address of the Router F follows the IP address of the Router C. FIG. 9 illustrates such a structure of the detection packet 1_8.

The Router F forwards the detection packet 1_8 based on forwarding information in an IP header of the detection packet 1_8 and forwarding information in a UDP header of the detection packet 1_8. It is assumed that the Router F forwards the detection packet 1_8 to the destination host PC3 based on the forwarding information in the IP header of the detection packet 1_8 and the forwarding information in the UDP header of the detection packet 1_8.

Upon receiving the detection packet 1_8, PC3 may parse the UDP header of the detection packet 1_8 and find that the checksum field in the UDP header of the detection packet 1_8 is equal to the designated check value (for example, 0x0) indicating a checksum error, thereby discarding the detection packet 1_8. So far, the process of forwarding the detection packet ends.

When no forwarding error message is received by the SDN controller in a set period of time, the SDN controller takes the forwarding error message received recently, i.e., the detection packet 1_7, as the last forwarding error message, and may determine the path of the Flow1 as follows: the IP address of the Router B, the IP address of the Router A and the IP address of the Router C are carried in the last forwarding error message and arranged therein in the same order as an order of the corresponding forwarding devices on the path of the Flow1; the Router F is determined as the last forwarding device on the path of the Flow1 based on the sampling method described above; and thus it is finally calculated that the path of the Flow1 sequentially involves the Router B, the Router A, the Router C and the Router F.

So far, the process in the example ends.

Methods of the present disclosure are described above. Devices of the present disclosure are described below.

Figure 11:
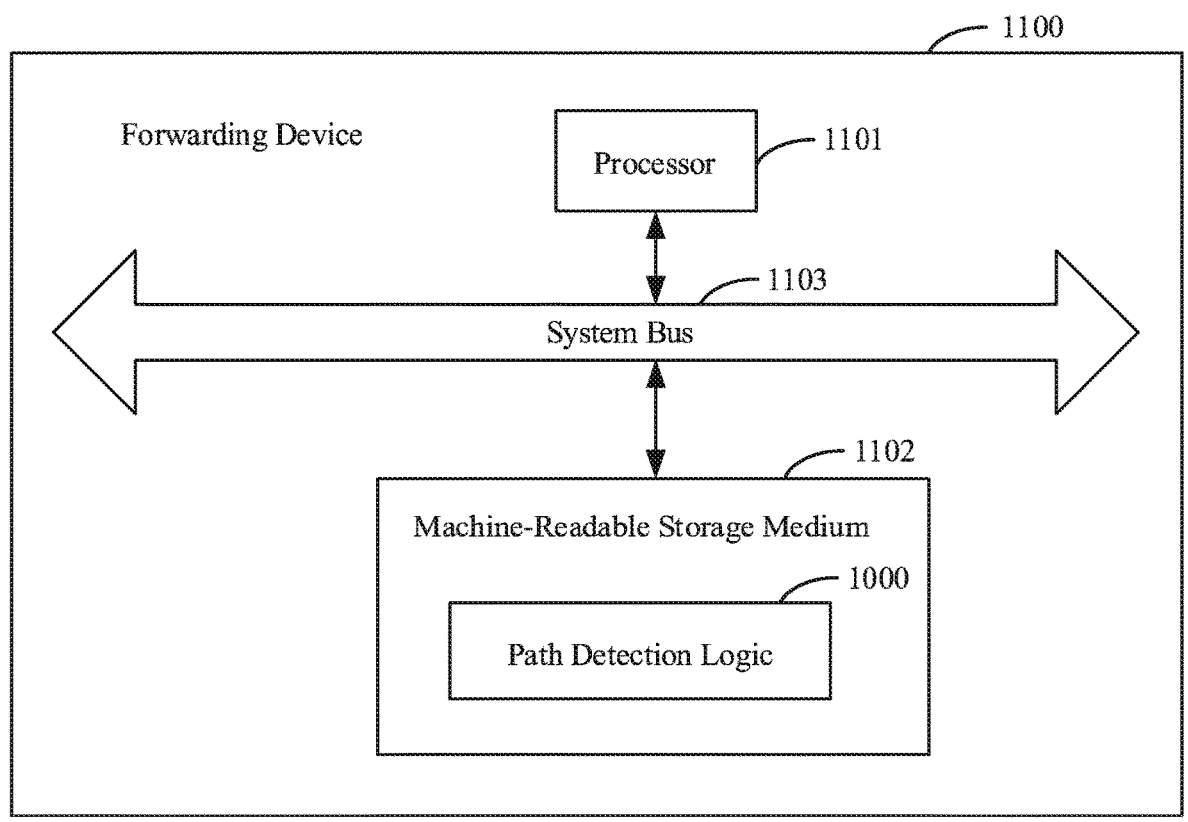
FIG. 11 is a schematic diagram illustrating a hardware structure of a forwarding device based on an example of the present disclosure.

FIG. 11 schematically illustrates a hardware structure of a forwarding device 1100 based on an example of the present disclosure. The forwarding device 1100 may include a processor 1101 and a machine-readable storage medium 1102. The processor 1101 may communicate with the machine-readable storage medium 1102 via a system bus 1103, and perform the above method of detecting a path by reading and executing machine-executable instructions corresponding to path detection logic 1000 stored in the machine-readable storage medium 1102.

As used herein, the machine-readable storage medium 1102 may be any electronic, magnetic, optical, or other physical storage apparatus which may contain or store information such as executable instructions, data, and the like. For example, the machine-readable storage medium 1102 may be any of a Random Access Memory (RAM), a volatile memory, a non-volatile memory, a flash memory, a storage drive (e.g., a hard drive), a solid state drive, any type of storage disc (e.g., a compact disc (CD), a Digital Versatile Disc (DVD), etc.), and the like, or a combination thereof.

Figure 10:
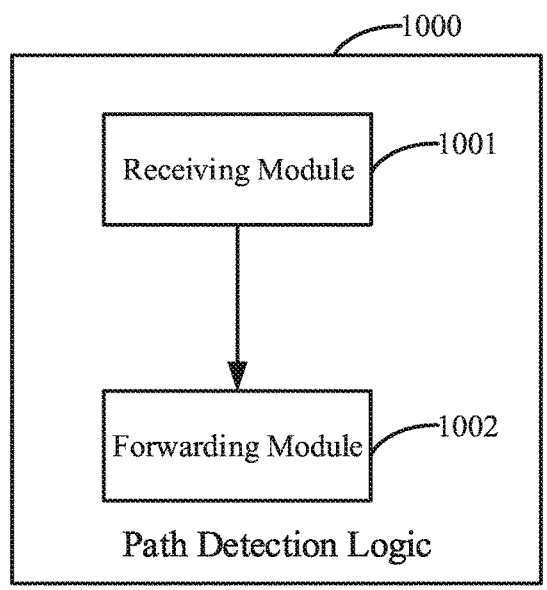
FIG. 10 is a schematic block diagram illustrating path detection logic based on an example of the present disclosure.

FIG. 10 is a schematic block diagram illustrating path detection logic 1000 based on an example of the present disclosure. The path detection logic 1000 can be applied to a forwarding device. As shown in FIG. 10, the path detection logic 1000 may include a receiving module 1001 and a forwarding module 1002.

The receiving module 1001 is configured to: receive a first detection packet for detecting a path of a designated service flow from a previous hop forwarding device on the path of the designated service flow, wherein forwarding information in a header of the first detection packet is the same as forwarding information in a header of the designated service flow, and a device address of at least one forwarding device on the path of the designated service flow is carried in a payload of the first detection packet.

The forwarding module 1002 is configured to: add a device address of the present forwarding device to the payload of the first detection packet to obtain a second detection packet; forward the second detection packet to a next hop forwarding device on the path of the designated service flow based on forwarding information in a header of the second detection packet; and send to a SDN controller a forwarding error message in which the device address of the at least one forwarding device in the payload of the first detection packet is carried, such that the SDN controller determines the path of the designated service flow based on the device address carried in the forwarding error message.

In an example, when the previous hop forwarding device is an initial forwarding device on the path of the designated service flow, the first detection packet is constructed by the initial forwarding device based on a control command from the SDN controller, and a device address of the initial forwarding device is carried in the payload of the first detection packet.

In an example, the header of the first detection packet comprises a TTL field which is set to an initial value.

In an example, the forwarding module 1002 is configured to: update the TTL field in the header of the first detection packet by subtracting a preset value from the TTL field, wherein the preset value is equal to the initial value of the TTL field; and when the updated TTL field is equal to zero, determine that an error occurs in forwarding of the first detection packet, and forward the forwarding error message to the SDN controller.

In an example, the first detection packet with the TTL field updated as zero is carried in the forwarding error message; and a TTL field in the header of the second detection packet is set to the initial value.

In an example, the header of the first detection packet further comprises a checksum field which is configured as a designated check value indicating a checksum error, such that a destination host corresponding to the designated service flow discards the first detection packet upon receiving the first detection packet.

In an example, the header of the first detection packet comprises an IP header and a transport layer protocol header. The TTL field is in the IP header, and the checksum field is in the transport layer protocol header. The forwarding information in the IP header may comprise a source IP address, a destination IP address, a protocol type and a Differentiated Services Code Point (DSCP). The forwarding information in the transport layer protocol header may comprise a source port number and a destination port number.

So far, the description of the logic illustrated in FIG. 10 ends.

Figure 13:
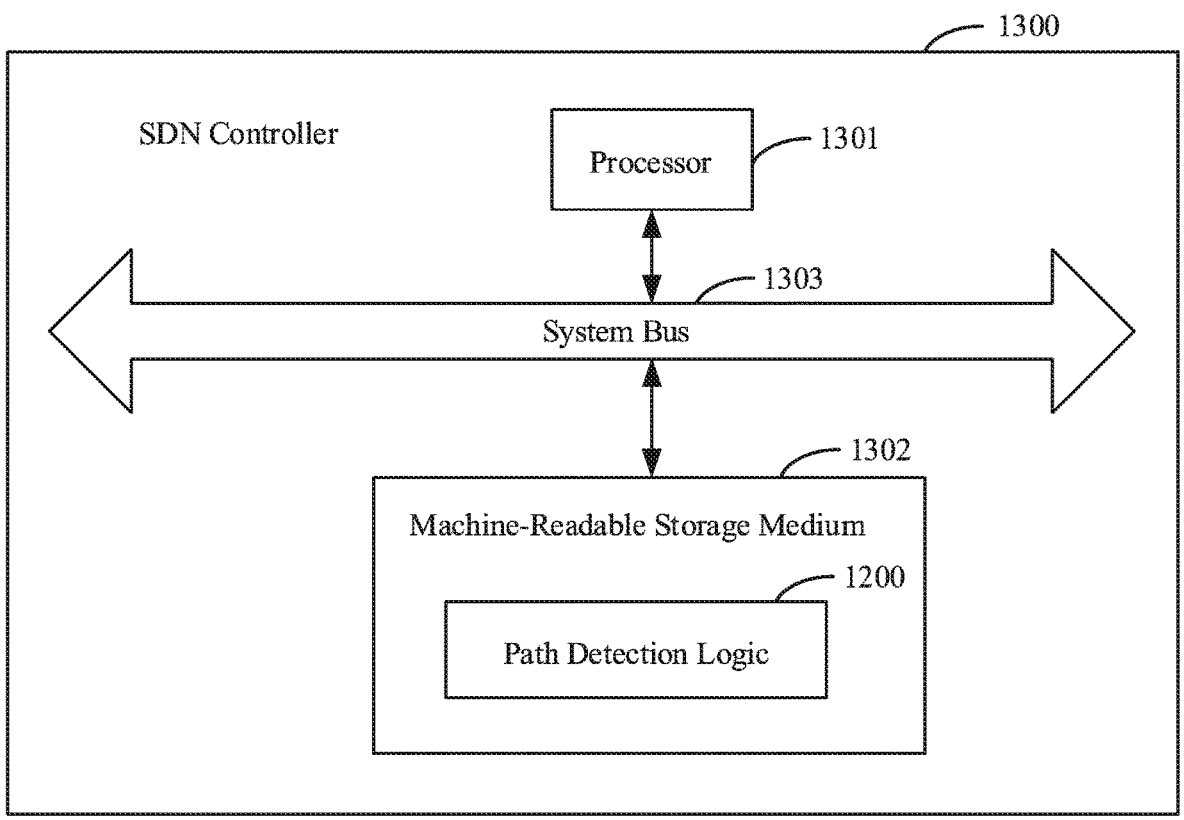
FIG. 13 is a schematic diagram illustrating a hardware structure of a software defined network (SDN) controller based on an example of the present disclosure.

FIG. 13 schematically illustrates a hardware structure of a SDN controller 1300 based on an example of the present disclosure. The SDN controller 1300 may include a processor 1301 and a machine-readable storage medium 1302. The processor 1301 may communicate with the machine-readable storage medium 1302 via a system bus 1303, and perform the above method of detecting a path by reading and executing machine-executable instructions corresponding to path detection logic 1200 stored in the machine-readable storage medium 1302.

As used herein, the machine-readable storage medium 1302 may be any electronic, magnetic, optical, or other physical storage apparatus which may contain or store information such as executable instructions, data, and the like. For example, the machine-readable storage medium 1302 may be any of a RAM, a volatile memory, a non-volatile memory, a flash memory, a storage drive (e.g., a hard drive), a solid state drive, any type of storage disc (e.g., a CD, a DVD, etc.), and the like, or a combination thereof.

Figure 12:
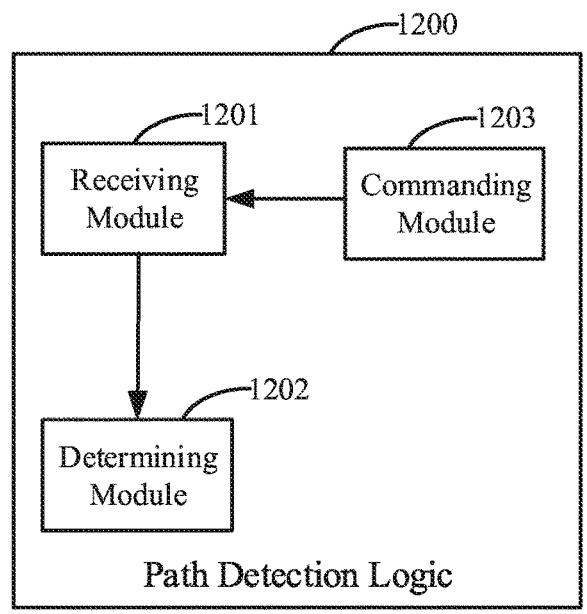
FIG. 12 is a schematic block diagram illustrating path detection logic based on another example of the present disclosure.

FIG. 12 is a schematic block diagram illustrating path detection logic 1200 based on another example of the present disclosure. The path detection logic 1200 can be applied to a SDN controller. As shown in FIG. 12, the path detection logic 1200 may include a receiving module 1201 and a determining module 1202.

The receiving module 1201 is configured to receive a forwarding error message from a forwarding device.

The determining module 1202 is configured to determine a path of a designated service flow based on all device addresses carried in a received last forwarding error message.

In an example, the logic 1200 further includes a commanding module 1203, which is configured to: determine an initial forwarding device on the path of the designated service flow, and send a control command to the initial forwarding device, such that the initial forwarding device constructs a detection packet.

So far, the description of the logic illustrated in FIG. 12 ends.

Since the device embodiments substantially correspond to the method embodiments, a reference may be made to part of the descriptions of the method embodiments for the related part. The device embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "comprising" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and a device provided according to the embodiments of the present disclosure. Specific examples are used herein to set forth the principles and the implementing methods of the present disclosure, and the descriptions of the above embodiments are only intended to help understanding of the method and the core idea of the present disclosure. Meanwhile, those of ordinary skill in the art may make alterations to the specific embodiments and the scope of application in accordance with the idea of the present disclosure. In conclusion, the present description shall not be interpreted as limitation to the present disclosure.

The invention claimed is:

1. A method for detecting a path, comprising:
   receiving, by a first forwarding device, a first detection packet sent from a previous hop forwarding device on a path of a designated service flow and used for detecting the path of the designated service flow, wherein forwarding information in a header of the first detection packet is the same as forwarding information in a header of the designated service flow, and a device address of at least one forwarding device on the path of the designated service flow is carried in a payload of the first detection packet; wherein responsive to determining that the previous hop forwarding device is an initial forwarding device on the path of the designated service flow, the first detection packet is constructed by the initial forwarding device based on a control command from a SDN controller, and a device address of the initial forwarding device is carried in the payload of the first detection packet; wherein the header of the first detection packet comprises an Internet Protocol (IP) header and a transport layer protocol header; a TTL field is in the IP header, and the checksum field is in the transport layer protocol header; forwarding information in the IP header comprises a source IP address, a destination IP address, a protocol type and a Differentiated Services Code Point (DSCP); and forwarding information in the transport layer protocol header comprises a source port number and a destination port number;

obtaining, by the first forwarding device, a second detection packet by adding a device address of the first forwarding device to the payload of the first detection packet;

forwarding, by the first forwarding device, the second detection packet to a next hop forwarding device on the path of the designated service flow based on the forwarding information in a header of the second detection packet; and sending, by the first forwarding device, to the SDN controller a forwarding error message in which the device address of the at least one forwarding device in the payload of the first detection packet is carried, such that the SDN controller determines the path of the designated service flow based on the device address carried in the forwarding error message.

2. The method according to claim 1, wherein
the header of the first detection packet comprises the TTL field which is set to an initial value.

3. The method according to claim 2, wherein the first forwarding device sending the forwarding error message to the SDN controller comprises:

updating, by the first forwarding device, the TTL field in the header of the first detection packet by subtracting a preset value from the TTL field, wherein the preset value is equal to the initial value of the TTL field; and responsive to determining that the updated TTL field is equal to zero, the first forwarding device determining that an error occurs in forwarding of the first detection packet, and sending the forwarding error message to the SDN controller.

4. The method according to claim 3, wherein
the first detection packet with the TTL field updated as zero is carried in the forwarding error message; and
a TTL field in the header of the second detection packet is set to the initial value.

5. The method according to claim 1, wherein the header of the first detection packet further comprises a checksum field which is configured as a designated check value indicating a checksum error, such that a destination host corresponding to the designated service flow discards the first detection packet upon receiving the first detection packet.

6. A forwarding device, comprising:
a processor, and
a machine-readable storage medium storing machine-executable instructions that, when executed by the processor, cause the processor to:
receive a first detection packet sent from a previous hop forwarding device on a path of a designated service flow and used for detecting the path of the designated service flow, wherein forwarding information in a header of the first detection packet is the same as forwarding information in a header of the designated service flow, and a device address of at least one forwarding device on the path of the designated service flow is carried in a payload of the first detection packet; wherein responsive to determining that the previous hop forwarding device is an initial forwarding device on the path of the designated service flow, the first detection packet is constructed by the initial forwarding device based on a control command from the SDN controller, and a device address of the initial forwarding device is carried in the payload of the first detection packet; wherein the header of the first detection packet comprises an Internet Protocol (IP) header and a transport layer protocol header; a TTL field is in the IP header, and the checksum field is in the transport layer protocol header; forwarding information in the IP header comprises a source IP address, a destination IP address, a protocol type and a Differentiated Services Code Point (DSCP); and forwarding information in the transport layer protocol header comprises a source port number and a destination port number;

obtain a second detection packet by adding a device address of the present forwarding device to the payload of the first detection packet;

forward the second detection packet to a next hop forwarding device on the path of the designated service flow based on the forwarding information in a header of the second detection packet; and send to a SDN controller a forwarding error message in which the device address of the at least one forwarding device in the payload of the first detection packet is carried, such that the SDN controller determines the path of the designated service flow based on the device address carried in the forwarding error message.

7. The forwarding device according to claim 6, wherein the header of the first detection packet comprises the TTL field which is set to an initial value.

8. The forwarding device according to claim 7, wherein the processor is caused by the machine-executable instructions to:

update the TTL field in the header of the first detection packet by subtracting a preset value from the TTL field, wherein the preset value is equal to the initial value of the TTL field; and responsive to determining that the updated TTL field is equal to zero, determine that an error occurs in forwarding of the first detection packet, and send the forwarding error message to the SDN controller.

9. The forwarding device according to claim 8, wherein the first detection packet with the TTL field updated as zero is carried in the forwarding error message; and
a TTL field in the header of the second detection packet is set to the initial value.

10. The forwarding device according to claim 6, wherein the header of the first detection packet further comprises a checksum field which is configured as a designated check value indicating a checksum error, such that a destination host corresponding to the designated service flow discards the first detection packet upon receiving the first detection packet.

11. A non-transitory storage medium storing machine-executable instructions that, when invoked and executed by a processor of a forwarding device, cause the processor to:
receive a first detection packet sent from a previous hop forwarding device on a path of a designated service flow and used for detecting the path of the designated service flow, wherein forwarding information in a header of the first detection packet is the same as forwarding information in a header of the designated service flow, and a device address of at least one forwarding device on the path of the designated service flow is carried in a payload of the first detection packet; wherein responsive to determining that the previous hop forwarding device is an initial forwarding device on the path of the designated service flow, the first detection packet is constructed by the initial forwarding device based on a control command from the SDN controller, and a device address of the initial forwarding device is carried in the payload of the first detection packet; wherein the header of the first detection packet comprises an Internet Protocol (IP) header and a transport layer protocol header; a TTL field is in the IP header, and the checksum field is in the transport layer protocol header; forwarding information in the IP header comprises a source IP address, a destination IP address, a protocol type and a Differentiated Services Code Point (DSCP); and forwarding information in the transport layer protocol header comprises a source port number and a destination port number;

obtain a second detection packet by adding a device address of the present forwarding device to the payload of the first detection packet;

forward the second detection packet to a next hop forwarding device on the path of the designated service flow based on the forwarding information in a header of the second detection packet; and send to a SDN controller a forwarding error message in which the device address of the at least one forwarding device in the payload of the first detection packet is carried, such that the SDN controller determines the path of the designated service flow based on the device address carried in the forwarding error message.

* * * * *